US012307998B2

(12) United States Patent
Cho et al.

(10) Patent No.: US 12,307,998 B2
(45) Date of Patent: May 20, 2025

(54) WINDOW AND DISPLAY DEVICE INCLUDING THE SAME

(71) Applicant: Samsung Display Co., Ltd., Yongin-Si (KR)

(72) Inventors: Jonghwan Cho, Yongin-si (KR); Myung-Seok Kwon, Yongin-si (KR); Hyuk-Hwan Kim, Yongin-si (KR); Sujin Sung, Yongin-si (KR); Jae Sul An, Yongin-si (KR); Sangwon Lee, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/442,108

(22) Filed: Feb. 15, 2024

(65) Prior Publication Data

US 2024/0296812 A1 Sep. 5, 2024

(30) Foreign Application Priority Data

Mar. 2, 2023 (KR) ........................ 10-2023-0027737

(51) Int. Cl.

*B32B 3/02* (2006.01)
*B32B 17/06* (2006.01)
*C03C 17/42* (2006.01)
*G09G 5/00* (2006.01)

(52) U.S. Cl.

CPC ................. *G09G 5/00* (2013.01); *B32B 3/02* (2013.01); *B32B 17/06* (2013.01); *C03C 17/42* (2013.01); *B32B 2255/28* (2013.01); *B32B 2457/20* (2013.01); *C03C 2217/23* (2013.01); *C03C 2217/285* (2013.01); *C03C 2217/734* (2013.01); *G09G 2300/04* (2013.01)

(58) Field of Classification Search

CPC .... B32B 3/02; B32B 7/12; G02B 1/11; G02B 1/14; G02B 1/16; H05K 5/03

See application file for complete search history.

(56) References Cited

U.S. PATENT DOCUMENTS

| | | | |
|---|---|---|---|
| 10,505,129 | B2 | 12/2019 | Loeffelbein et al. |
| 10,822,271 | B2 | 11/2020 | Adib et al. |
| 10,908,321 | B2 | 2/2021 | Fujii et al. |
| 2021/0033751 | A1 | 2/2021 | Hart et al. |
| 2021/0047236 | A1 | 2/2021 | Adib et al. |
| 2021/0178730 | A1 | 6/2021 | Baby et al. |

(Continued)

FOREIGN PATENT DOCUMENTS

| | | | |
|---|---|---|---|
| JP | 6561823 | B2 | 8/2019 |
| JP | 2020-037511 | A | 3/2020 |

(Continued)

OTHER PUBLICATIONS

KR 2022/0046050 (Year: 2022).*

*Primary Examiner* — Elizabeth E Mulvaney
(74) *Attorney, Agent, or Firm* — Innovation Counsel LLP

(57) ABSTRACT

Provided are a window and a display device including the window. The window may include a base layer having a refractive index of about of 1.6 to about 2.0, a first layer on an upper side of the base layer and having a refractive index lower than that of the base layer, a second layer on an upper side of the first layer, a middle adhesive layer between the first layer and the second layer, and a print layer on a lower side of the base layer.

20 Claims, 8 Drawing Sheets

(56) References Cited

U.S. PATENT DOCUMENTS

| | | | | |
|---|---|---|---|---|
| 2021/0238085 | A1 | 8/2021 | Li et al. | |
| 2023/0418336 | A1* | 12/2023 | Seo | G06F 1/1607 |
| 2024/0103199 | A1* | 3/2024 | Ahn | C09D 183/08 |
| 2024/0160248 | A1* | 5/2024 | Kang | H04M 1/0268 |
| 2024/0237492 | A1* | 7/2024 | Choi | H10K 59/8792 |

FOREIGN PATENT DOCUMENTS

| | | | |
|---|---|---|---|
| JP | 6843743 | B2 | 3/2021 |
| JP | 6911828 | B2 | 7/2021 |
| KR | 10-2013-0059020 | A | 6/2013 |
| KR | 10-2020-0004369 | A | 1/2020 |
| KR | 10-2020-0091484 | A | 7/2020 |
| KR | 10-2021-0049838 | A | 5/2021 |
| KR | 10-2265027 | B1 | 6/2021 |

* cited by examiner

WINDOW AND DISPLAY DEVICE INCLUDING THE SAME

CROSS-REFERENCE TO RELATED APPLICATIONS

This U.S. non-provisional patent application claims priority under 35 U.S.C. § 119 of Korean Patent Application No. 10-2023-0027737, filed on Mar. 2, 2023, the entire contents of which are hereby incorporated by reference.

BACKGROUND

The present disclosure relates to a window and a display device including the window, and more particularly, to a window having a low reflectance and excellent mechanical properties, and a display device including the window.

Various multimedia devices such as televisions, mobile phones, tablets, computers, game consoles, and the like, use display devices to provide image information to users. A display device may include a window and a display panel for displaying an image. The window may be disposed on the front surface of the display device, thereby protecting the display panel from external impact and providing an active region to a user. The window may be deformed by a folding or bending operation or easily damaged by an external impact. Therefore, a window that exhibits excellent strength and improves display quality is desired. In addition, in order to improve image visibility, there is a need for research on a structure for reducing reflectance of light incident on the display device.

SUMMARY

The present disclosure provides a window having a low reflectance and excellent mechanical strength.

The present disclosure also provides a display device having high display efficiency while maintaining a low surface reflectance.

An embodiment disclosed herein provides a window including a base layer having a transmission region and a bezel region adjacent to the transmission region and having a refractive index of about 1.6 to about 2.0, a first layer disposed on an upper side of the base layer and having a refractive index lower than the refractive index of the base layer, a second layer disposed on an upper side of the first layer, a middle adhesive layer disposed between the first layer and the second layer, and a print layer disposed on a lower side of the base layer. In an embodiment, the first layer, the second layer, and the middle adhesive layer may each overlap the transmission region and the bezel region, and the print layer may overlap the bezel region.

In an embodiment, the refractive index of the base layer may be about 1.8 to about 2.0.

In an embodiment, a refractive index of the first layer may be about 1.3 to about 1.5, and a refractive index of the middle adhesive layer may be about 1.3 to about 1.6.

In an embodiment, the first layer and the middle adhesive layer may each include at least one of silicon dioxide ($SiO_2$), fused silica, fluorine-doped fused silica, magnesium fluoride ($MgF_2$), calcium fluoride ($CaF_2$), aluminum fluoride ($AlF_3$), yttrium fluoride ($YF_3$), ytterbium fluoride ($YbF_3$), yttrium oxyfluoride (YOF), aluminum oxide ($Al_2O_3$), magnesium oxide (MgO), or $Si_xO_yMg_zAl_uN_v$. In the $Si_xO_yMg_zAl_uN_v$, each of x, y, z, u, and v may be in a range from 0 to 1 and a sum x+y+z+u+v is equal to or less than 1.

In an embodiment, the first layer may include the magnesium fluoride ($MgF_2$) or may include a solid solution in which the magnesium fluoride ($MgF_2$), the yttrium oxyfluoride (YOF), and the magnesium oxide (MgO) are mixed.

In an embodiment, the middle adhesive layer may include a solid solution in which aluminum oxide and silicon dioxide are mixed.

In an embodiment, the base layer may include a glass substrate or a polymer film.

In an embodiment, the second layer may include a fluorine-based compound.

In an embodiment, Specular Component Included (SCI) reflectance on an upper surface of the second layer may be about 0.5% or less.

In an embodiment, the thickness of the print layer may be about 5 μm to about 20 μm.

In an embodiment, the print layer may include a first print layer on a lower surface of the base layer, and a second print layer on a lower surface of the first print layer, wherein the first print layer and the second print layer may each include at least one of an acrylic urethane-based compound, an epoxy-based compound, a polyester-based compound, or an epoxy ester-based compound.

In an embodiment, the first print layer may include the acrylic urethane-based compound or the polyester-based compound, and the second print layer may include the epoxy-based compound or the epoxy ester-based compound.

In an embodiment, the thickness of the first print layer may be about 3 μm to about 8 μm, and the thickness of the second print layer may be about 5 μm to about 10 μm.

In an embodiment, the print layer may further include a third print layer disposed in a lower portion of the second print layer, wherein the third print layer may include an epoxy ester-based compound.

In an embodiment, the thickness of the first print layer may be about 2 μm to about 5 μm, and the thickness of the second print layer and the thickness of the third print layer may each be about 3 μm to about 5 μm.

In an embodiment, the thickness of the first layer may be about 2 nm to about 40 nm, the thickness of the second layer may be about 2 nm to about 40 nm, and the thickness of the middle adhesive layer may be about 5 nm to about 30 nm.

In an embodiment, a display device includes a display module and a window on the display module. The display module includes a base substrate having a display region and a non-display region adjacent to the display region, a circuit layer disposed on the base substrate, and a display element layer disposed on the circuit layer and having a light control layer. In an embodiment, the window may include a base layer having a refractive index of about of 1.6 to about 2.0, a first layer disposed on the base layer and having a refractive index lower than that of the base layer, a second layer disposed on the first layer, a middle adhesive layer disposed between the first layer and the second layer, and a print layer disposed on a lower side of the base layer.

BRIEF DESCRIPTION OF THE FIGURES

The drawings illustrate exemplary embodiments of the present disclosure and, together with the written description, serve to explain principles of example structures and processes.

DETAILED DESCRIPTION

Figure 1:
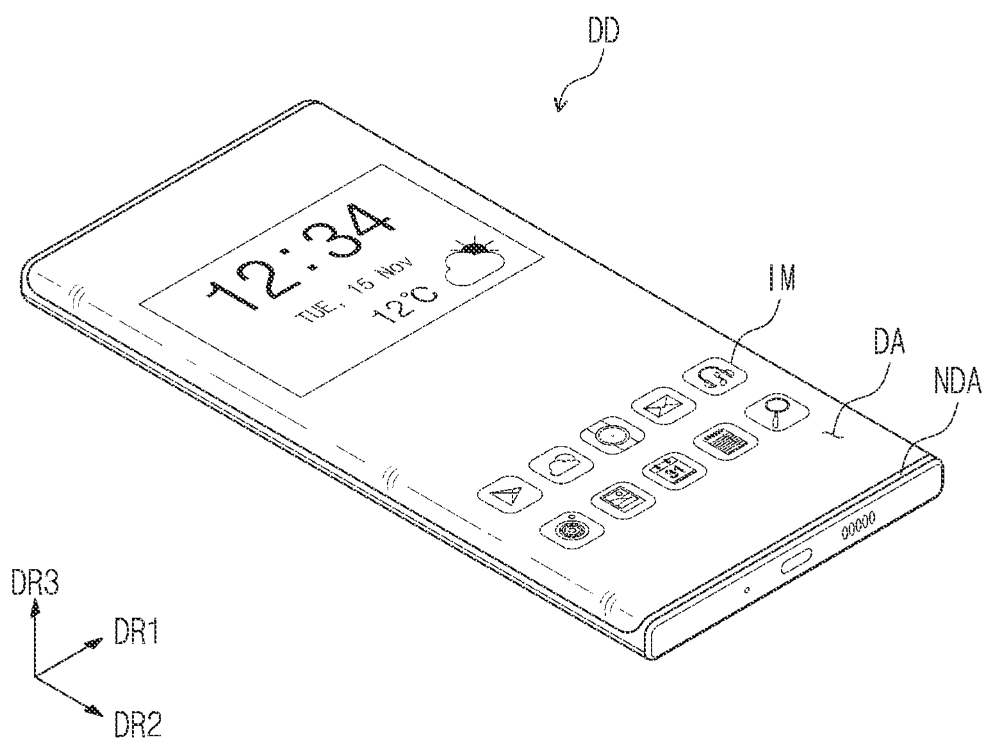
FIG. 1 is a perspective view showing a display device according to an embodiment of the present disclosure.

In the present disclosure, when an element (or a region, a layer, a portion, etc.) is referred to as being "on," "connected to," or "coupled to" another element, the element may be directly disposed on/connected to/coupled to the other element or a third element may be disposed therebetween.

Although the terms "first," "second," etc. may be used herein to describe various elements, these elements should not be limited by these terms. These terms are only used to distinguish one element from another. For example, a first element may be referred to as a second element, and a second element may also be referred to as a first element in a similar manner without departing the scope of the disclosure. The terms of a singular form may include plural forms unless the context clearly indicates otherwise.

In addition, terms such as "below," "lower," "above," "upper," and the like are used to describe the relationship of the elements shown in the drawings. These terms are used as a relative concept and may be described with reference to the direction indicated in the drawings.

The term "and/or" includes any and all combinations of one or more of the associated elements. It should be understood that the term "comprise" or "have" is intended to specify the presence of stated features, integers, steps, operations, elements, components, or combinations thereof in the disclosure but does not preclude the presence or addition of one or more other features, integers, steps, operations, elements, components, or combinations thereof.

In the present disclosure, one structure being "directly disposed" on another structure means that there is no layer, film, region, plate, or the like added between the two structures. For example, being "directly disposed" may mean being disposed without additional members such as an adhesive member between two layers or two members.

Unless otherwise defined, all terms (including technical and scientific terms) used herein have the same meaning as commonly understood by one of ordinary skill in the art to which the present invention pertains. It is also to be understood that terms such as terms defined in commonly used dictionaries should be interpreted as having meanings consistent with the meanings in the context of the related art and should not be interpreted in too ideal of a sense or in an overly formal sense unless explicitly defined herein.

Hereinafter, embodiments will be described with reference to the accompanying drawings. Like reference numerals used in different drawings refer to like elements. Also, in the drawings, the thickness, the ratio, and the dimensions of elements may be exaggerated for an effective description of technical contents.

Figure 2:
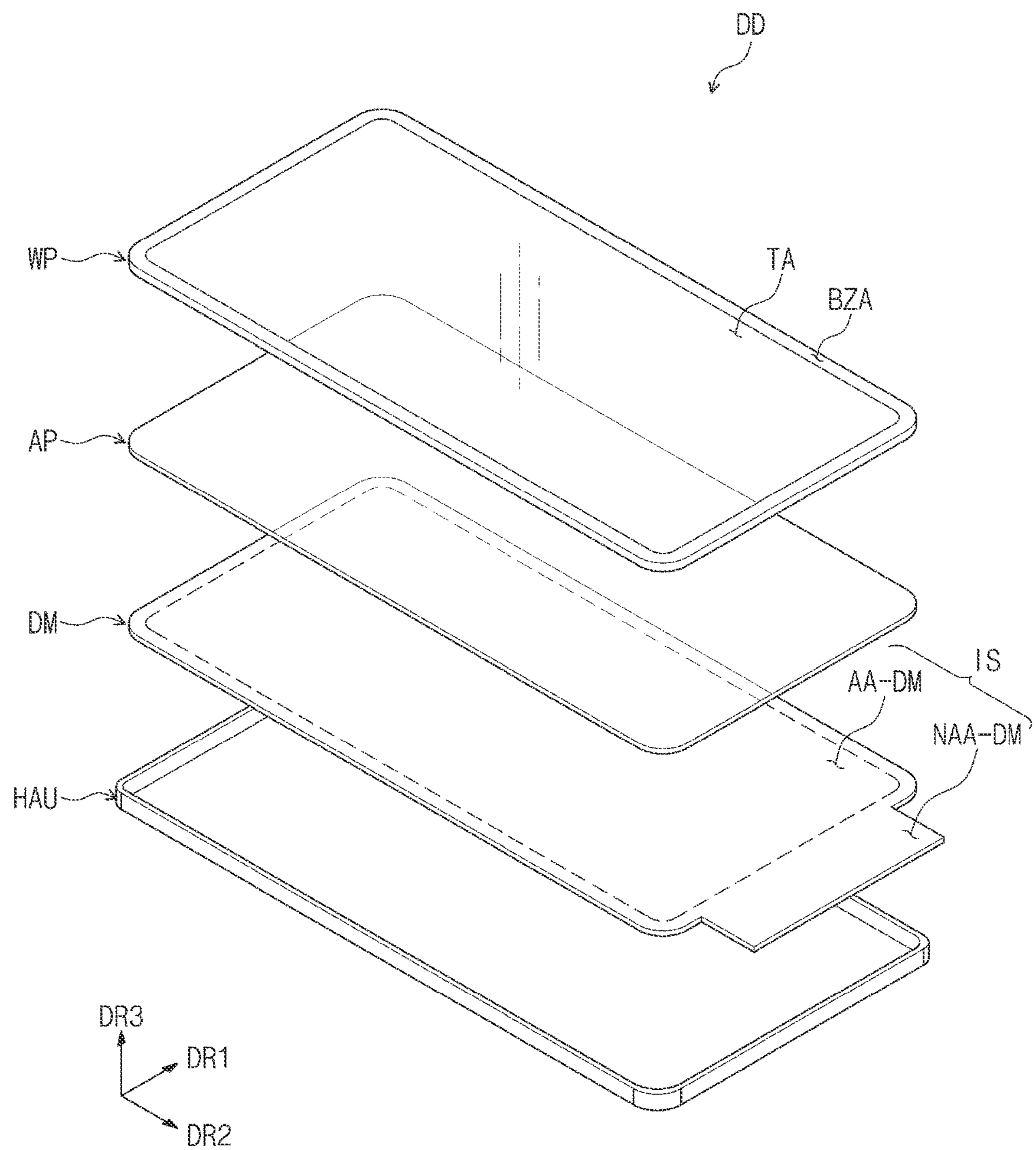
FIG. 2 is an exploded perspective view showing a display device according to an embodiment of the present disclosure.

FIG. 1 is a perspective view of a display device according to an embodiment of the present disclosure. FIG. 2 is an exploded perspective view of the display device of FIG. 1.

Referring to FIG. 1, a display device DD may be a device activated in response to an electrical signal. FIG. 1 shows an example in which the display device DD is a mobile telephone, but the display device DD may alternatively be any device that displays an image. For example, the display device DD may alternatively be a tablet, a personal computer, a laptop, a personal digital terminal, a game console, a portable electronic apparatus, a television, a monitor, an external advertisement billboard, a car navigation system unit, or a wearable device, but the embodiment is not limited thereto.

The display device DD according to an embodiment may display an image IM through a display region DA. In FIG. 1, as an example of the image IM, a watch or clock and a plurality of icons are illustrated. The display region DA may have a surface lying in a plane defined by a first direction axis DR1 and a second direction axis DR2. The display region DA may include a curved surface bent on at least one side from the plane defined by the first direction axis DR1 and the second direction axis DR2. The display device DD illustrated in FIG. 1 includes two curved surfaces respectively on opposite sides of the display region DA and bent downward from the plane defined by the first direction axis DR1 and the second direction axis DR2. However, the shape of the display region DA is not limited thereto. For example, the display region DA may reside only the plane defined by the first direction axis DR1 and the second direction axis DR2. In this case, the display device DD may not include a curved surface bent from a side surface of the plane defined by the first direction axis DR1 and the second direction axis DR2. Alternatively, the display region DA may further include four curved surfaces respectively bent from at least two (for example, four) side surfaces of the plane defined by the first direction axis DR1 and the second direction axis DR2.

The display device DD in an embodiment may be flexible. For example, the display device DD may be a foldable display device. Alternatively, the display device DD may be rigid.

A non-display region NDA may be adjacent to the display region DA. The non-display region NDA may surround the display region DA. Accordingly, the shape of the display region DA may be substantially defined by the non-display region NDA. However, this is only an example, and the non-display region NDA may be disposed adjacent to only one side of the display region DA or may be omitted. The display region DA may be provided in various shapes and is not limited to any one embodiment.

In FIG. 1 and the following drawings, first, second, and third direction axes DR1, DR2, and DR3 are illustrated. The first to third direction axes DR1, DR2, and DR3 are described in the present disclosure to indicate relative positioning of elements, and other axes or coordinates systems may alternatively be used to define positioning and directions. In addition, the directions indicated by the first to third direction axes DR1, DR2, and DR3 may be described as first to third directions, and the first to third direction axes DR1, DR2, and DR3 and the first to third directions may use the same reference numerals. In the present specification, the first direction axis DR1 and the second direction axis DR2 are perpendicular to each other, and the third direction axis DR3 may be a normal direction with respect to a plane defined by the first direction axis DR1 and the second direction axis DR2. In addition, in the present disclosure, "in a plan view" may mean when viewed in the third direction axis DR3.

A thickness direction of the display device DD may be a direction parallel to the third direction axis DR3, which is a normal direction with respect to the plane defined by the first direction axis DR1 and the second direction axis DR2. In the present specification, a front surface (or an upper surface, an upper portion surface, or an upper side) and a back surface (or a lower surface, a lower portion surface, or a lower side) of members constituting the display device DD may be defined based on the third direction axis DR3. In addition, in the present specification, a direction in which the third direction axis DR3 is extended is parallel to the thickness direction, and the front surface (or the upper surface, the upper portion surface, or the upper side) refers to a surface (or a direction) adjacent to a surface on which the image IM is displayed, and the back surface (or the lower surface, the lower portion surface, or the lower side) refers to a surface (or a direction) spaced apart from the surface on which the image IM is displayed.

The display device DD according to an embodiment of the present disclosure may sense a user input applied to the display device DD. The user input may include various forms of external inputs such as may be provided using a part of a user's body, light, heat, or pressure. The display device DD may sense the user input applied to a front surface, a side surface, or a back surface of the display device DD depending on the configuration of the display device DD, and the display device DD is not limited to any one embodiment.

Referring to FIG. 2, the display device DD may include a display module DM, a window WP disposed on the display module DM, and an adhesive member AP disposed between the display module DM and the window WP. In addition, the display device DD may further include a housing HAU in which the display module DM is accommodated.

In the display device DD illustrated in FIG. 1 and FIG. 2, the window WP and the housing HAU are coupled together to define the appearance of the display device DD. The housing HAU may provide a predetermined internal space. The display module DM may be accommodated in the internal space of the housing HAU.

The housing HAU may include a material having relatively high rigidity. For example, the housing HAU may include glass, plastic, or a metal or may include a plurality of frames and/or plates composed of a combination thereof. The housing HAU may stably protect components of the display device DD accommodated in the internal space from an external impact.

The display module DM may display the image IM and may sense an external input. The image IM may be displayed on a front surface IS of the display module DM. The front surface IS of the display module DM includes an active region AA-DM and a peripheral region NAA-DM. The active region AA-DM may be a region activated in response to an electrical signal. The active region AA-DM may be a region in which the image IM is displayed, and at the same time, may be a region in which an external input is sensed. The peripheral region NAA-DM is adjacent to at least one side of the active region AA-DM. The peripheral region NAA-DM may surround the active region AA-DM. In the peripheral region NAA-DM, a circuit, a line, or the like for driving the active region AA-DM may be disposed.

The display module DM may include a display panel and a sensor layer. The image IM may be substantially displayed in the display panel, and the external input may be substantially sensed in the sensor layer. The display module DM including both the display panel and the sensor layer may simultaneously display the image IM and sense an external input. A more detailed description thereof is provided below.

The display device DD of an embodiment may further include a driving circuit. The driving circuit may include a flexible circuit board and a main circuit board. The flexible circuit board may be electrically connected to the display module DM. The flexible circuit board may connect the display module DM and the main circuit board. However, this is just an example, and the flexible circuit board may not be connected to the main circuit board, or the flexible circuit board may instead be a rigid substrate.

The flexible circuit board may be connected to pads disposed in the peripheral region NAA-DM of the display module DM. The flexible circuit board may provide to the display module DM an electrical signal for driving the display module DM. The electrical signal may be generated in the flexible circuit board or may be generated in the main circuit board. The main circuit board may include various driving circuits for driving the display module DM, connectors for supplying power, or the like. The main circuit board may be connected to the display module DM through the flexible circuit board.

FIG. 2 illustrates the display module DM in an unfolded state, but at least a portion of the display module DM may be bent. In the present embodiment, a portion of the display module DM may be bent toward a back surface of the display module DM, and the portion bent toward the back surface may be a portion to which the main circuit board is connected. Accordingly, the main circuit board may be assembled while being in the state of overlapping the back surface of the display module DM.

The adhesive member AP may be disposed between the display module DM and window WP. The display module DM and the window WP may be coupled by the adhesive member AP.

The window WP may include an optically transparent material. The window WP may include an insulation panel. For example, the window WP may be composed of glass, plastic, or a combination thereof.

The window WP may include a transmission region TA and a bezel region BZA. The transmission region TA may overlap at least a portion of the active region AA-DM of the display module DM. The transmission region TA may be an optically transparent region. For example, the transmission region TA may be a region having a visible light transmittance of about 90% or higher. The image IM may be provided to a user and particularly may be viewed through the transmission region TA.

The bezel region BZA may be a region having a relatively low light transmittance compared to the transmission region TA. The bezel region BZA may define the shape of the transmission region TA. The bezel region BZA may be adjacent to the transmission region TA and may surround the transmission region TA.

The bezel region BZA may have a predetermined color. The bezel region BZA may cover the peripheral region NAA-DM of the display module DM to block the peripheral region NAA-DM from being visually recognized from the outside. However, embodiments of the present disclosure are not limited to what is illustrated, and the bezel region BZA may be disposed adjacent to only one side of the transmission region TA, or at least a portion of the bezel region BZA may be omitted. In the display device DD of an embodiment, the transmission region TA may correspond to the display region DA, and the bezel region BZA may correspond to the non-display region NDA.

Figure 3:
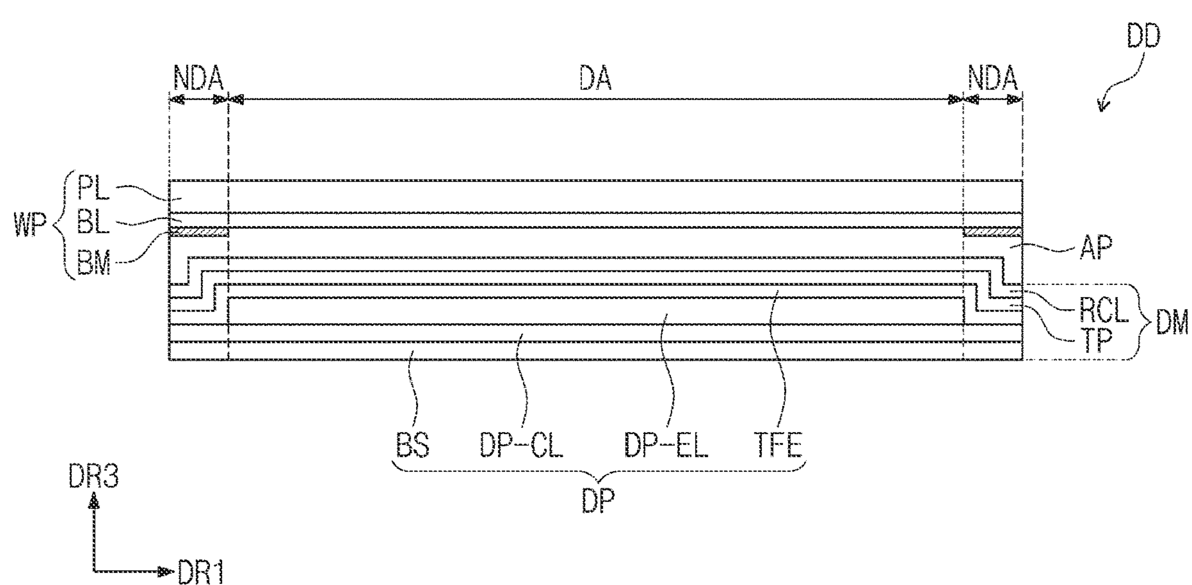
FIG. 3 is a cross-sectional view of a display device according to an embodiment of the present disclosure.

FIG. 3 is a cross-sectional view of a display device DD in accordance with an embodiment of the present disclosure. FIG. 3 particularly shows a cross-section of structure including the display module DM, the adhesive member AP, and the window WP, which are illustrated in FIG. 2.

Referring to FIG. 3, in the display device DD of an embodiment, the display module DM may include a display panel DP and a sensor layer TP and may further include an anti-reflection layer RCL as a light control layer. Among a plurality of layers included in the display module DM, the anti-reflection layer RCL may be coupled to the window WP through the adhesive member AP.

The display panel DP may be a component which substantially generates the image IM (see FIG. 1). The display panel DP may be a light emitting-type display panel. For example, the display panel DP may be an organic light emitting display panel, an inorganic light emitting display panel, a micro-LED display panel, or a nano-LED display panel. The display panel DP may also be referred to as a display layer. In an embodiment, the display panel DP may include a base substrate BS, a circuit layer DP-CL, a display element layer DP-EL, and an encapsulation layer TFE.

The base substrate BS may be a member which provides a base surface on which the circuit layer DP-CL is disposed. The base substrate BS may be a rigid substrate or may be a flexible substrate capable of bending, folding, rolling, or the like. The base substrate BS may be a glass substrate, a metal substrate, a polymer substrate, or the like. However, the embodiment is not limited thereto, and the base substrate BS may be an inorganic layer, an organic layer, or a composite material layer.

The base substrate BS may have a multi-layered structure. For example, the base substrate BS may include a first synthetic resin layer, a multi-layered or single-layered inorganic layer disposed on the first synthetic resin layer, and a second synthetic resin layer disposed on the multi-layered or single-layered inorganic layer. Each of the first and second synthetic resin layers may include a polyimide-based resin but is not particularly limited thereto.

The circuit layer DP-CL may be disposed on the base substrate BS. The circuit layer DP-CL may include an insulation layer, a semiconductor pattern, a conductive pattern, a signal line, and the like. For example, the circuit layer DP-CL may include a switching transistor and a driving transistor for switching and driving of a light emitting element of the display element layer DP-EL.

The display element layer DP-EL may be disposed on the circuit layer DP-CL. The display element layer DP-EL may overlap the display region DA and may not overlap the non-display region NDA. The display element layer DP-EL may include a light emitting element. For example, the light emitting element may include an organic light emitting material, an inorganic light emitting material, an organic-inorganic light emitting material, a quantum dot, a quantum rod, a micro-LED, or a nano-LED.

The encapsulation layer TFE may be disposed on the display element layer DP-EL. The encapsulation layer TFE may overlap the display region DA and the non-display region NDA and may cover the display element layer DP-EL. The encapsulation layer TFE may protect the display element layer DP-EL from foreign materials such as moisture, oxygen, and dust particles. The encapsulation layer TFE may include at least one inorganic layer. In addition, the encapsulation layer TFE may further include at least one organic layer. The encapsulation layer TFE may include a stacked structure of alternating inorganic and organic layers, e.g., an inorganic layer/an organic layer/an inorganic layer.

The sensor layer TP may be disposed on the display panel DP. The sensor layer TP may sense an external input applied from the outside. The external input may be a user input. The user input may include various forms of external inputs, such as provided using a part of a user's body, light, heat, a pen, a pressure, or the like.

The sensor layer TP may be formed on display panel DP through a continuous process. In this case, the sensor layer TP may be directly disposed on the display panel DP. Here, "being directly disposed" may mean that a third element is not disposed between the sensor layer TP and the display panel DP. That is, a separate adhesive member may not be disposed between the sensor layer TP and the display panel DP.

The anti-reflection layer RCL may be directly disposed on the sensor layer TP. The anti-reflection layer RCL may reduce the reflectance of external light incident from the outside of the display device DD. The anti-reflection layer RCL may be formed on the sensor layer TP through a continuous process. The anti-reflection layer RCL may include color filters. The color filters may have a predetermined arrangement. For example, the color filters may be arranged in consideration of emission colors of pixels included in the display panel DP. In addition, the anti-reflection layer RCL may further include a black matrix adjacent to the color filters. The anti-reflection layer RCL is described in more detail below.

In an embodiment, the sensor layer TP may be omitted. In this case, the anti-reflection layer RCL may be directly disposed on the display panel DP. In an embodiment, the position of the sensor layer TP and the position of the anti-reflection layer RCL are interchanged.

Although not illustrated, in an embodiment, the display device DD may further include an optical layer disposed above the anti-reflection layer RCL. For example, the optical layer may be formed above the anti-reflection layer RCL through a continuous process. The optical layer may improve front surface luminance of the display device DD by controlling the direction of emitted light from the display panel DP. For example, the optical layer may include an organic insulation layer in which openings are defined respectively corresponding to light emitting regions of the pixels included in the display panel DP, and a high-refractive layer may fill the openings and cover the organic insulation layer. The high-refractive layer may have a refractive index higher than that of the organic insulation layer.

The window WP may provide a front surface of the display device DD. The window WP may include a print layer BM, a base layer BL, and a functional layer PL. The functional layer PL may be disposed on one surface of the base layer BL. The functional layer PL may include a material having a lower refractive index than a material included in the base layer BL. The functional layer PL included in the window WP is described in more detail with reference to FIG. 5. The print layer BM may be disposed opposing the functional layer PL with the base layer BL interposed therebetween. The print layer BM overlaps the non-display region NDA, does not overlap the display region DA, and may be disposed in or below a portion of the base layer BL. For example, the print layer BM may be an ink print layer on a bottom surface of the base layer BL. In addition or alternatively, the print layer BM may be a layer formed by including a pigment or a dye in a portion of the base layer BL. In the window WP of an embodiment, the above-described bezel region BZA (see FIG. 2) may be a portion in which the print layer BM is provided.

Figure 4:
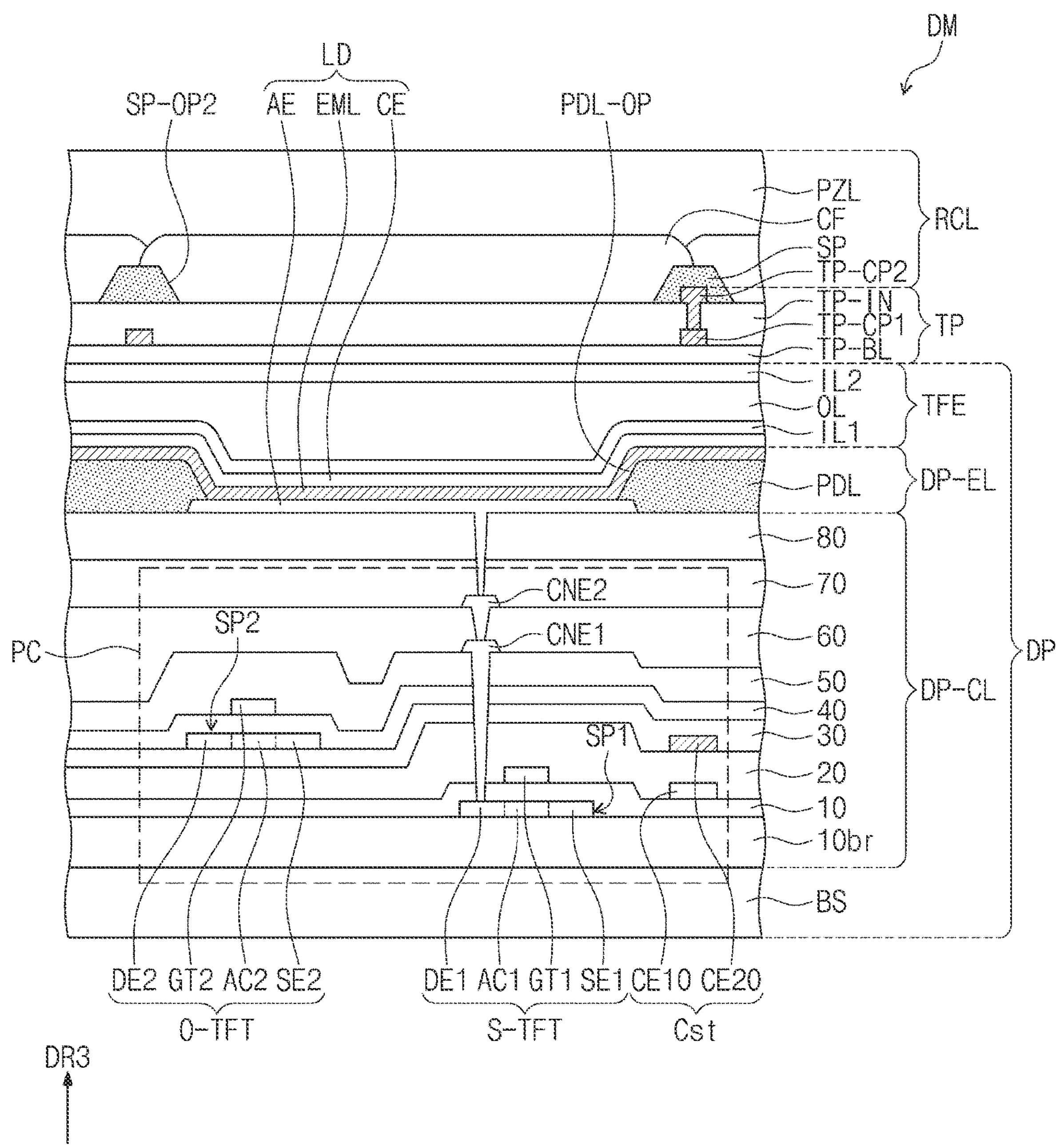
FIG. 4 is a cross-sectional view of a portion of a display module according to an embodiment of present disclosure.

FIG. 4 is a cross-sectional view showing a portion of a display module according to an embodiment of the present disclosure. In FIG. 4, a partial cross-section of one light emitting element LD and a pixel circuit PC included in a display module DM is illustrated.

A display panel DP included in the display module DM of an embodiment may include a base substrate BS. The base substrate BS may be a member which provides a base surface on which a circuit layer DP-CL is disposed. The base substrate BS may be a glass substrate, a metal substrate, a plastic substrate, a silicon substrate, or the like. However, embodiments are not limited thereto, and the base substrate BS may be an inorganic layer, an organic layer, or a composite material layer.

A buffer layer 10*br* may be disposed on the base substrate BS. The buffer layer 10*br* may prevent a phenomenon in which metal atoms or impurities from the base substrate BS diffuse into a first semiconductor pattern SP1 on an upper side of the buffer layer 10*br*. The first semiconductor pattern SP1 includes a channel region AC1 of a silicon transistor S-TFT. The buffer layer 10*br* may control the rate at which heat is provided during a crystallization process for forming the first semiconductor pattern SP1 so as to allow the first semiconductor pattern SP1 to be uniformly formed.

The first semiconductor pattern SP1 may be disposed on the buffer layer 10*br*. The first semiconductor pattern SP1 may include a silicon semiconductor. For example, the silicon semiconductor may include amorphous silicon, polycrystalline silicon, monocrystalline silicon, or the like. For example, the first semiconductor pattern SP1 may include low-temperature polysilicon.

FIG. 4 only illustrates a portion of the first semiconductor pattern SP1 disposed on the buffer layer 10*br*, and the first semiconductor pattern SP1 may be further disposed in other regions. The first semiconductor pattern SP1 may be arranged across pixels according to a specific rule. Portions of the first semiconductor pattern SP1 may have different electrical properties depending on whether or not the portions are doped. The first semiconductor pattern SP1 may include a first region having a high conductivity and a second region having a low conductivity. The first region may be doped with an N-type dopant or a P-type dopant. A P-type transistor may include a doped region doped with a P-type dopant, and an N-type transistor may include a doped region doped with an N-type dopant. The second region may be a non-doped region or a region doped to a concentration lower than that of the first region.

The conductivity of the first region may be greater than the conductivity of the second region, and the first region may substantially serve as an electrode or a signal line. The second region may substantially correspond to an active region (or a channel) of a transistor. In other words, a portion of the first semiconductor pattern SP1 may be an active region of a transistor, and another portion thereof may be a source or drain of the transistor, and the other portion thereof may be a connection electrode or connection signal line.

A source region SE1 (or a source), the channel region AC1 (or a channel), and a drain region DE1 (or a drain) of the silicon transistor S-TFT may be formed from the first semiconductor pattern SP1. The source region SE1 and the drain region DE1 may extend in opposite directions from each other from the channel region AC1 on a cross-section.

Although not illustrated, a back-surface metal layer may be disposed in each of a lower portion of the silicon transistor S-TFT and a lower portion of an oxide transistor O-TFT. The back-surface metal layer may be disposed overlapping the pixel circuit PC and may block external light from reaching the pixel circuit PC. The back-surface metal layer may be disposed between the base substrate BS and the buffer layer 10*br*. Alternatively, the back-surface metal layer may be disposed between a second insulation layer 20 and a third insulation layer 30. The back-surface metal layer may include a reflective metal. For example, the back-surface metal layer may include silver (Ag), an alloy containing silver, molybdenum (Mo), an alloy containing molybdenum, aluminum (Al), an alloy containing aluminum, aluminum nitride (AlN), tungsten (W), tungsten nitride (WN), copper (Cu), p+ doped amorphous silicon, or the like. The back-surface metal layer may be connected to an electrode or a line and may receive a constant voltage or a signal from the electrode or the line. According to an embodiment, the back-surface metal layer may be a floating electrode isolated from another electrode or line. In an embodiment, an inorganic barrier layer may be further disposed between the base substrate BS and the buffer layer 10*br*.

A first insulation layer 10 may be disposed on the buffer layer 10*br*. The first insulation layer 10 commonly overlaps multiple pixels and may cover the first semiconductor pattern SP1. The first insulation layer 10 may be an inorganic layer and/or an organic layer and may have a single-layered or multi-layered structure. The first insulation layer 10 may include at least one of aluminum oxide, titanium oxide, silicon oxide, silicon nitride, silicon oxynitride, zirconium oxide, or hafnium oxide. In the present embodiment, the first insulation layer 10 may be a single-layered silicon oxide layer. The first insulation layer 10 is part of the circuit layer DP-CL, but the circuit layer DP-CL also includes other insulation layers described further below. Each of these insulation layers may be an inorganic layer and/or an organic layer and may have a single-layered structure or multi-layered structure. The inorganic insulation layers may include at least one of the above-described materials but are not limited thereto.

A gate GT1 of the silicon transistor S-TFT is disposed on the first insulation layer 10. The gate GT1 may be a portion of a metal pattern. The gate GT1 overlaps the channel region AC1. In a process of doping the first semiconductor pattern SP1, the gate GT1 may serve as a mask. The gate GT1 may include titanium (Ti), silver (Ag), an alloy containing silver, molybdenum (Mo), an alloy containing molybdenum, aluminum (Al), an alloy containing aluminum, aluminum nitride (AlN), tungsten (W), tungsten nitride (WN), copper (Cu), indium tin oxide (ITO), indium zinc oxide (IZO), or the like but is not particularly limited thereto.

The second insulation layer 20 is disposed on the first insulation layer 10 and may cover the gate GT1. The third insulation layer 30 may be disposed on the second insulation layer 20. A second electrode CE20 of a storage capacitor Cst may be disposed between the second insulation layer 20 and the third insulation layer 30. In addition, a first electrode CE10 of the storage capacitor Cst may be disposed between the first insulation layer 10 and the second insulation layer 20.

A second semiconductor pattern SP2 may be disposed on the third insulation layer 30. The second semiconductor pattern SP2 may include a channel region AC2 of the oxide transistor O-TFT, which is further described below. The second semiconductor pattern SP2 may include an oxide semiconductor. The second semiconductor pattern SP2 may include a transparent conductive oxide (TCO) such as indium tin oxide (ITO), indium zinc oxide (IZO), indium gallium zinc oxide (IGZO), zinc oxide (ZnO), indium oxide ($In_2O_3$), or the like.

The second semiconductor pattern SP2 may include a plurality of regions of transparent conductive oxide that may have different properties depending on whether the transparent conductive oxide has been reduced or not. A region in which the transparent conductive oxide has been reduced (hereinafter, a reduction region) has conductivity greater than that of a region in which the transparent conductive oxide has not been reduced (hereinafter, a non-reduction region). The reduction region substantially may serve as a source/drain or signal line of a transistor. The non-reduction region may correspond to a semiconductor region (or an active region or a channel) of a transistor. In other words, a portion of the second semiconductor pattern SP2 may be a semiconductor region of a transistor, another portion of the second semiconductor pattern SP2 may be a source region/drain region of the transistor, and yet another portion of the second semiconductor patter SP2 may be a signal transmission region.

A source region SE2 (or a source), the channel region AC2 (or a channel), and a drain region DE2 (or a drain) of the oxide transistor O-TFT may be formed from the second semiconductor pattern SP2. The source region SE2 and the drain region DE2 may extend in opposite directions from opposite sides of the channel region AC2 in a plan view.

A fourth insulation layer 40 may be disposed on the third insulation layer 30. The fourth insulation layer 40 commonly overlaps a plurality of pixels and may cover the second semiconductor pattern SP2. Although not illustrated, the fourth insulation layer 40, which overlaps a gate GT2 of the oxide transistor O-TFT, may be patterned to expose the source region SE2 and the drain region DE2 of the oxide transistor O-TFT for electrical connections.

The gate GT2 of the oxide transistor O-TFT is disposed on the fourth insulation layer 40. The gate GT2 of the oxide transistor O-TFT may be a portion of a metal pattern. The gate GT2 of the oxide transistor O-TFT overlaps the channel region AC2.

A fifth insulation layer 50 is disposed on the fourth insulation layer 40 and may cover the gate GT2. A first connection electrode CNE1 may be disposed on the fifth insulation layer 50. The first connection electrode CNE1 may be connected to the drain region DE1 of the silicon transistor S-TFT through a contact-hole passing through the first to fifth insulation layers 10, 20, 30, 40, and 50.

A sixth insulation layer 60 may be disposed on the fifth insulation layer 50. A second connection electrode CNE2 may be disposed on the sixth insulation layer 60. The second connection electrode CNE2 may be connected to the first connection electrode CNE1 through a contact-hole passing through the sixth insulation layer 60. A seventh insulation layer 70 is disposed on the sixth insulation layer 60 and may cover the second connection electrode CNE2. An eighth insulation layer 80 may be disposed on the seventh insulation layer 70.

The sixth insulation layer 60, the seventh insulation layer 70, and the eighth insulation layer 80 may each be an organic layer. For example, the sixth insulation layer 60, the seventh insulation layer 70, and the eighth insulation layer 80 may each include a general purpose polymer such as benzocyclobutene (BCB), polyimide, hexamethyldisiloxane (HMDSO), polymethylmethacrylate (PMMA), or polystyrene (PS), a polymer derivative having a phenolic group, an acrylic polymer, an imide-based polymer, an aryl ether-based polymer, an amide-based polymer, a fluorine-based polymer, a p-xylene-based polymer, a vinyl alcohol-based polymer, a blend thereof, or the like.

A display element layer DP-EL may be disposed on the circuit layer DP-CL. The display element layer DP-EL may include the light emitting element LD and a pixel definition film PDL.

The light emitting element LD may include a first electrode AE (or a pixel electrode), a light emitting layer EML, and a second electrode CE (or a common electrode). Each of the light emitting layer EML and the second electrode CE may be commonly formed in a plurality of pixels.

The first electrode AE of the light emitting element LD may be disposed on the eighth insulation layer 80. The first electrode AE of the light emitting element LD may be a (semi)transmissive electrode or reflective electrode. According to an embodiment, the first electrode AE of the light emitting element LD may include a reflective layer formed of Ag, Mg, Al, Pt, Pd, Au, Ni, Nd, Ir, Cr, a compound thereof, or the like, and a transparent or translucent electrode layer formed on the reflective layer. The transparent or translucent electrode layer may be provided with at least one material selected from the group consisting of indium tin oxide (ITO), indium zinc oxide (IZO), indium gallium zinc oxide (IGZO), zinc oxide (ZnO) or indium oxide ($In_2O_3$), and aluminum-doped zinc oxide (AZO). For example, the first electrode AE of the light emitting element LD may include a stacked structure of ITO/Ag/ITO.

The pixel definition film PDL may be disposed on the eighth insulation layer 80. The pixel definition film PDL may include the same material and may be formed through the same process that forms the eighth insulation layer 80. The pixel definition film PDL may have properties of absorbing light, and for example, the pixel definition film PDL may have a black color. The pixel definition film PDL may include a black coloring agent. The black coloring agent may include a black dye and/or a black pigment. The black coloring agent may include carbon black, a metal such as chromium, or an oxide thereof. The pixel definition film PDL may correspond to a light blocking pattern having light blocking properties.

The pixel definition film PDL may cover a portion of the first electrode AE of the light emitting element LD. For example, in the pixel definition film PDL, an opening PDL-OP, which exposes a portion of the first electrode AE of the light emitting element LD, may be defined. The pixel definition film PDL may increase the distance between an edge of the first electrode AE of the light emitting element LD and the second electrode CE thereof. Therefore, the pixel definition film PDL may serve to prevent arcs and the like from occurring at edges of the first electrodes AE.

Although not illustrated, a hole control layer may be disposed between the first electrode AE and the light emitting layer EML. The hole control layer includes a hole transport layer and may further include a hole injection layer. An electron control layer may be disposed between the light emitting layer EML and the second electrode CE. The electron control layer includes an electron transport layer and may further include an electron injection layer. The hole control layer and the electron control layer may be commonly formed in the plurality of pixels using an open mask.

The encapsulation layer TFE may be disposed on the display element layer DP-EL. The encapsulation layer TFE may cover the light emitting element LD. The encapsulation layer TFE may include at least one inorganic layer and at least one organic layer. For example, the encapsulation layer TFE may include a first inorganic layer IL1, an organic layer OL, and a second inorganic layer IL2 sequentially stacked, but layers constituting the encapsulation layer TFE are not limited thereto.

The first and second inorganic layers IL1 and IL2 may protect the display element layer DP-EL from moisture and oxygen, and the organic layer OL may protect the display element layer DP-EL from foreign substances such as dust particles. The first and second inorganic layers IL1 and IL2 may each include a silicon nitride layer, a silicon oxynitride layer, a silicon oxide layer, a titanium oxide layer, an aluminum oxide layer, or the like. The organic layer OL may include an acrylic organic layer but is not limited thereto.

A sensor layer TP may be disposed on the display panel DP. The sensor layer TP may be referred to as a sensor, an input sensing layer, or an input sensing panel. The sensor layer TP may include a sensor base layer TP-BL, a first conductive layer TP-CP1, a sensing insulation layer TP-IN, and a second conductive layer TP-CP2.

The sensor base layer TP-BL may be directly disposed on the display panel DP. The sensor base layer TP-BL may be an inorganic layer including at least one of silicon nitride, silicon oxynitride, or silicon oxide. Alternatively, the sensor base layer TP-BL may be an organic layer including an epoxy resin, an acrylic resin, or an imide-based resin. The sensor base layer TP-BL may have a single-layered structure or a multi-layered structure in which layers are stacked along the third direction DR3.

Each of the first conductive layer TP-CP1 and the second conductive layer TP-CP2 may have a single-layered structure or a multi-layered structure in which layers are stacked along the third direction DR3. The first conductive layer TP-CP1 and the second conductive layer TP-CP2 may include conductive lines which define a sensing electrode of a mesh shape. The conductive lines may not overlap the opening PDL-OP and may overlap the pixel definition film PDL.

A conductive layer of a single-layered structure may include a metal layer or a transparent conductive layer. The metal layer may include molybdenum, silver, titanium, copper, aluminum, or an alloy thereof. The transparent conductive layer may include a transparent conductive oxide such as indium tin oxide (ITO), indium zinc oxide (IZO), zinc oxide (ZnO), indium tin zinc oxide (ITZO), or the like. In addition, the transparent conductive layer may include a conductive polymer such as PEDOT, a metal nanowire, graphene, or the like.

A conductive layer of a multi-layered structure may include metal layers. The metal layers may have, for example, a three-layered structure of titanium/aluminum/titanium. The conductive layer of a multi-layered structure may include at least one metal layer and at least one transparent conductive layer.

The sensing insulation layer TP-IN may be disposed between the first conductive layer TP-CP1 and the second conductive layer TP-CP2. The sensing insulation layer TP-IN may include an inorganic film. The inorganic film may include at least one of aluminum oxide, titanium oxide, silicon oxide, silicon nitride, silicon oxynitride, zirconium oxide, or hafnium oxide.

Alternatively, the sensing insulation layer TP-IN may include an organic film. The organic film may include at least one of an acrylic resin, a methacrylic resin, polyisoprene, a vinyl-based resin, an epoxy-based resin, a urethane-based resin, a cellulose-based resin, a siloxane-based resin, a polyimide-based resin, a polyamide-based resin, or a perylene-based resin.

In an embodiment, a light control layer may be disposed on the sensor layer TP. The light control layer may include an anti-reflection layer RCL. The anti-reflection layer RCL may include a light blocking pattern SP, a plurality of color filters CF, and a planarization layer PZL.

The anti-reflection layer RCL may lower the reflectance of external light. The anti-reflection layer RCL includes the plurality of color filters CF, and the plurality of color filters CF may have a predetermined arrangement. The plurality of color filters CF may be arranged in consideration of emission colors of pixels included in the display panel DP. Meanwhile, in the display module DM of an embodiment, the anti-reflection layer RCL may lower the reflectance of the display module DM through the plurality of color filters CF without including a phase retarder and a polarizer. In the display module DM of an embodiment, the anti-reflection layer RCL may not include a polarizing film or a polarizing layer. However, the embodiment is not limited thereto, and the anti-reflection layer RCL may include a polarizing film or a polarizing layer.

A material constituting the light blocking pattern SP is not particularly limited as long as it is a material that absorbs light. The light blocking pattern SP may be a layer having a black color, and in an embodiment, the light blocking pattern SP may include a black coloring agent. The black coloring agent may include a black dye and/or a black pigment. The black coloring agent may include carbon black, a metal such as chromium, or an oxide thereof.

The light blocking pattern SP may include the second conductive layer TP-CP2 of the sensor layer TP. The light blocking pattern SP may prevent external light reflection due to the second conductive layer TP-CP2. The light blocking pattern SP may overlap a portion of the pixel definition film PDL.

A partition opening SP-OP2 may be defined in the light blocking pattern SP. In a plan view, the partition opening SP-OP2 may overlap the first electrode AE of the light emitting element LD. Any one of the color filters CF may overlap the first electrode AE of the light emitting element LD. Any one of the color filters CF may cover the partition opening SP-OP2. Each of the color filters CF may be in contact with the light blocking pattern SP.

The planarization layer PZL may cover the light blocking pattern SP and the color filter CF. The planarization layer PZL may include an organic material, and a flat surface may be provided on an upper surface of the planarization layer PZL. In an embodiment, the planarization layer PZL may be omitted.

Figure 5:
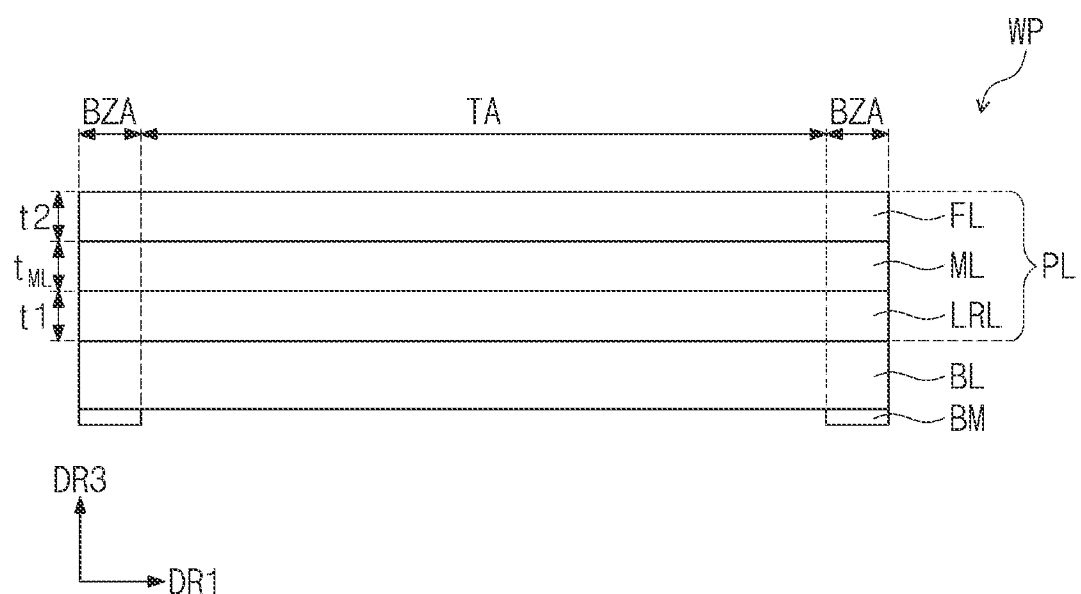
FIG. 5 is a cross-sectional view of a window according to an embodiment of the present disclosure.

FIG. 5 is a cross-sectional view of a window according to an embodiment of the present disclosure. Referring to FIG. 5, a window WP may include a print layer BM, a base layer BL, and a functional layer PL. The functional layer PL may include a first layer LRL, a second layer FL, and a middle adhesive layer ML. In the window WP of an embodiment, the print layer BM, the base layer BL, the first layer LRL, the middle adhesive layer ML, and the second layer FL may be sequentially stacked.

The print layer BM may be disposed on one surface of the base layer BL. The print layer BM may be provided on a lower surface of the base layer BL adjacent to the display module DM (see FIG. 3). The print layer BM is described in more detail with reference to FIG. 6A and FIG. 6B.

The base layer BL may include a transparent material. In an embodiment, the base layer BL may include glass, tempered glass, or a polymer film. In an embodiment, the base layer BL may be a chemically reinforced glass substrate. When the base layer BL is a chemically reinforced glass substrate, the base layer BL may have increased mechanical strength while being thin, and thus, may be used for a window of a foldable display device. When the base layer BL includes a polymer film, the base layer BL may include a polyimide (PI) film or a polyethylene terephthalate (PET) film. The base layer BL of the window WP may have a multi-layered structure or single-layered structure. For example, the base layer BL may have a structure in which a plurality polymer films are coupled through an adhesive member or may have a structure in which a glass substrate and a polymer film are coupled using an adhesive. The base layer BL may be made of a soft material.

The base layer BL may be a layer for improving the hardness of the window WP and lowering the surface reflectance of the window WP. The base layer BL may have a relatively high refractive index compared to the functional layer PL. For example, the refractive index of the base layer BL may be about 1.6 to about 2.0 at a wavelength of about 550 nm. In the window WP of an embodiment, the refractive index of the base layer BL may be about 1.8 to about 2.0, and the first layer LRL has a refractive index less than about 1.5. When the refractive index of the base layer BL satisfies the above range at a wavelength of about 550 nm, the reflectance of the base layer BL may be reduced. For example, the surface reflectance of the base layer BL may be about 0.5% or less. The base layer BL of an embodiment may have a surface reflectance of about 0.2% to about 0.5%. Accordingly, the surface reflectance of the window WP may be reduced at a wavelength of about 550 nm.

Since the base layer BL of an embodiment has a high refractive index, a critical angle of light guiding the inside of the base layer BL is small, so that an angle range for totally reflecting light may be wide inside the base layer BL. Therefore, the window WP may exhibit ultra-low reflection properties by including the base layer BL of an embodiment.

The thickness of the base layer BL may be, for example, about 20 μm to about 60 μm. Preferably, the thickness of the base layer BL may be about 20 μm to about 40 μm. FIG. 5 exemplarily illustrates the base layer BL in a rectangular shape, but the embodiment is not limited thereto, and the base layer BL according to an embodiment may have a shape in which an edge portion of an upper surface of the base layer BL is rounded by a curved surface. More specifically, the base layer BL may have a shape in which an edge portion of an upper surface thereof overlapping the bezel region BZA (see FIG. 2) is rounded by a curved surface.

The first layer LRL is a layer having a refractive index lower than that of the base layer BL and may be a layer for lowering the surface reflectance of the window WP. The first layer LRL may be disposed on the base layer BL. The first layer LRL may be a layer directly disposed on the base layer BL. The first layer LRL is disposed on the upper surface of the base layer BL, and a lower surface of the base layer BL may be a surface adjacent to the above-described display module DM (see FIG. 3). That is, the first layer LRL may be spaced apart from the display module DM with the base layer BL interposed therebetween.

The first layer LRL may include a material having a low refractive index, and having excellent adhesion to the base layer BL. The first layer LRL may include a first material, and the first material may include a material having a lower refractive index than a material included in the base layer BL. The first material included in the first layer LRL may include, for example, at least one of silica, fused silica ($SiO_2$, or silicon dioxide), fluorine-doped fused silica, magnesium fluoride ($MgF_2$), calcium fluoride ($CaF_2$), aluminum fluoride ($AlF_3$), yttrium fluoride ($YF_3$), ytterbium fluoride ($YbF_3$), yttrium oxyfluoride (YOF), aluminum oxide ($Al_2O_3$), magnesium oxide (MgO), or $Si_xO_yMg_zAl_uN_v$. In the $Si_xO_yMg_zAl_uN_v$, x, y, z, u, and v may each be independently in a range from 0 to 1, wherein the total sum(x+y+z+u+v) of x, y, z, u, and v may be 1 or less. For example, the $Si_xO_yMg_zAl_uN_v$ may be represented by $Si_xO_yMg_z$ when u and v are 0.

In an embodiment, the first layer LRL may include magnesium fluoride ($MgF_2$). The first layer LRL may be a single layer composed of magnesium fluoride. Alternatively, the first layer LRL may further include magnesium oxide (MgO) and yttrium oxyfluoride (YOF) in addition to magnesium fluoride. The first layer LRL may include a solid solution including magnesium oxide in the structure. For example, the first layer LRL may include a solid solution in which magnesium oxide, magnesium fluoride, and yttrium oxyfluoride are mixed.

The first layer LRL may have a thickness t1 of, for example, about 50 nm to about 150 nm. When the thickness t1 of the first layer LRL is less than about 50 nm, the surface reflectance of the window WP may not be sufficiently reduced. When the thickness t1 of the first layer LRL is greater than about 150 nm, the total thickness of the window WP may increase, thereby excessively increasing the overall thickness of the display device DD (see FIG. 3).

At a wavelength of about 550 nm, the refractive index of the first layer LRL may be about 1.3 to about 1.5. In the window WP of an embodiment, the refractive index of the first layer LRL may be about 1.38 to about 1.40 at a wavelength of about 550 nm. Since the refractive index of the first layer LRL satisfies the above range at a wavelength of about 550 nm, the surface reflectance of the window WP may be reduced.

The first layer LRL may be formed through various deposition methods. For example, the first layer LRL may be formed on the base layer BL by methods such as a spray coating process, a deep coating process, a spin coating process, a vapor deposition process, and the like. The vapor deposition process may include physical vapor deposition (PVD), electron beam deposition, ion-assisted deposition, laser ablation, vacuum are deposition, thermal evaporation, plasma enhanced chemical vapor deposition, and the like, but the embodiment is not limited thereto.

In an embodiment, the first layer LRL may be formed through an ion-assisted deposition process. The first layer LRL may contain magnesium oxide, magnesium fluoride, and yttrium oxyfluoride as described above. In a process of forming the first layer LRL, each of magnesium oxide, magnesium fluoride, and yttrium oxyfluoride is deposited on a surface of the base layer BL in the form of particles, while ionized argon (Ar) gas and/or oxygen ($O_2$) gas are provided together during a deposition process, so that the adhesion of a deposition film with respect to the surface of the base layer BL may be improved. Alternatively, the first layer LRL may be formed of a single material of magnesium fluoride, and the magnesium fluoride may be deposited on a surface of the base layer BL in the form of particles, while ionized argon (Ar) gas and/or or oxygen ($O_2$) gas are provided together during a deposition process, so that the adhesion of a deposition film with respect to the surface of the base layer BL may be improved. For example, when forming the first layer LRL, each of magnesium oxide, magnesium fluoride, and yttrium oxyfluoride is deposited on a surface of the base layer BL in the form of particles in a vacuum degree of about $11.0\times1.0^{-5}$ torr to about $5.0\times1.0^{-5}$ torr, ionized argon (Ar) gas may be provided for about 5 minutes to about 10 minutes.

When forming the first layer LRL through an ion-assisted deposition process, oxygen ($O_2$) gas, which is a reactive gas, may be provided with argon (Ar). The composition ratio of the oxygen ($O_2$) gas and the argon (Ar) gas in the ion-assisted deposition process may be about 5 to 30:30 to 5, but the embodiment is not limited thereto.

The first layer LRL of the functional layer PL may have a single-layered structure formed of a single material. The first layer LRL may be a single layer formed of magnesium fluoride as described above, or a single layer formed of a solid solution in which magnesium oxide, magnesium fluoride, and yttrium oxyfluoride are mixed. That is, the first layer LRL may not include a plurality of layers.

The second layer FL of the functional layer PL is disposed on the first layer LRL and may be a layer which improves slip properties, scratch resistance, and the like of a surface of the window WP. In an embodiment, the second layer FL may be an anti-fingerprint layer having excellent fingerprint resistance and suppressing surface wear. The second layer FL may be spaced apart from the first layer LRL, and the middle adhesive layer ML may be interposed between the first layer LRL and the second layer FL. The second layer FL may be the uppermost layer of the window WP, and an upper surface of the second layer FL may define the uppermost surface of the window WP.

The second layer FL may include a second material having excellent scratch resistance and excellent slip properties and low refractive properties. In an embodiment, the second layer FL may include a fluorine-based compound as the second material. The second layer FL may include, for example, a perfluorinated polyether (PFPE) compound. The second layer FL may include a perfluoropolyether silane, a perfluoroalkylether alkoxysilane, a perfluoroalkylether copolymer, or the like. When the second layer FL includes the perfluorinated polyether compound, the fingerprint resistance and scratch resistance of the second layer FL may be improved.

The second layer FL may have a thickness t2 of, for example, about 2 nm to about 40 nm. When the thickness t2 of the second layer FL is less than about 2 nm, the fingerprint resistance and scratch resistance of the window WP may be reduced. When the thickness t2 of the second layer FL is greater than about 40 nm, the reflectance of the window WP may increase, and the total thickness of the window WP may increase, thereby excessively increasing the overall thickness of the display device DD (see FIG. 3).

At a wavelength of about 550 nm, the refractive index of the second layer FL may be about 1.3 to about 1.5. In the window WP of an embodiment, at a wavelength of about 550 nm, the refractive index of the second layer FL may be about 1.30 to about 1.35. For example, the refractive index of the second layer FL may be about 1.32 at a wavelength of about 550 nm. Since the refractive index of the second layer FL satisfies the above range at a wavelength of about 550 nm, the surface reflectance of the window WP may be reduced.

The middle adhesive layer ML is disposed on the first layer LRL, and may be a layer for improving adhesion between the first layer LRL and the second layer FL. The middle adhesive layer ML may be an adhesion promoter for improving interlayer adhesion between the first layer LRL and the second layer FL by having excellent adhesion with respect to each of the first layer LRL and the second layer FL. The middle adhesive layer ML may be directly disposed on the first layer LRL.

The middle adhesive layer ML may have low refractive properties while having excellent mechanical strength and may include a material for improving adhesion. The middle adhesive layer ML may include a third material. The third material may include a material having a lower refractive index than a material included in the base layer BL. The third material included in the middle adhesive layer ML may include, for example, at least one of silica, fused silica, fluorine-doped fused silica, magnesium fluoride ($MgF_2$), calcium fluoride ($CaF_2$), aluminum fluoride ($AlF_3$), yttrium fluoride ($YF_3$), ytterbium fluoride ($YbF_3$), yttrium oxyfluoride (YOF), aluminum oxide ($Al_2O_3$), magnesium oxide (MgO), or $Si_xO_yMg_zAl_uN_v$. In the $Si_xO_yMg_zAl_uN_v$, x, y, z, u, and v may each be independently in a range from 0 to 1, wherein the total sum (x+y+z+u+v) of x, y, z, u, and v may be 1 or less. For example, the $Si_xO_yMg_zAl_uN_v$ may be $Si_xO_yMg_z$ when u and v are 0. In an embodiment, the third material may include at least one of silicon dioxide ($SiO_2$ or silica) or aluminum oxide ($Al_2O_3$).

In an embodiment, the middle adhesive layer ML may include a solid solution including silicon dioxide and aluminum oxide. The middle adhesive layer ML may include, for example, a solid solution in which aluminum oxide and silicon dioxide are mixed. For example, the third material included in the middle adhesive layer ML may have a solid solution structure including $Si_9Al_2O_{10}$. The middle adhesive layer ML including $Si_9Al_2O_{10}$ may have excellent mechanical strength, thermal shock resistance, and acid resistance, as well as providing excellent insulation. The middle adhesive layer ML may be formed in the same manner as the first layer LRL. For example, the middle adhesive layer ML may be formed on the first layer LRL through an ion-assisted deposition process.

The middle adhesive layer ML may have a thickness $t_{ML}$ of, for example, about 5 nm to about 30 nm. When the thickness $t_{ML}$ of the middle adhesive layer ML is less than about 5 nm, the adhesion between the first layer LRL and the second layer FL may not be improved, and the mechanical strength of the window WP may be reduced. When the thickness $t_{ML}$ of the middle adhesive layer ML is greater than about 30 nm, the surface reflectance of the window WP may increase, and the total thickness of the window WP may increase, thereby excessively increasing the overall thickness of the display device DD (see FIG. 3).

At a wavelength of about 550 nm, the refractive index of the middle adhesive layer ML may be about 1.3 to about 1.6. In the window WP of an embodiment, the refractive index of the middle adhesive layer ML may be about 1.45 to about 1.50 at a wavelength of about 550 nm. Since the refractive index of the middle adhesive layer ML satisfies the above range at a wavelength of about 550 nm, the surface reflectance of the window WP may be reduced. In an embodiment, the middle adhesive layer ML includes $Si_9Al_2O_{10}$ and may have a refractive index of about 1.48 at a wavelength of about 550 nm.

The middle adhesive layer ML may have a single-layered structure formed of a single material. As described above, the middle adhesive layer ML may be a single layer formed of a solid solution in which magnesium oxide and silicon dioxide are mixed, or a single layer formed of a solid solution in which aluminum oxide and silicon dioxide are mixed. In an embodiment, the middle adhesive layer ML may be a single layer formed of $Si_9Al_2O_{10}$. That is, the middle adhesive layer ML may not include a plurality of layers.

In an embodiment, the total sum of thicknesses of the first layer LRL, the middle adhesive layer ML, and the second later FL may be about 200 nm or less. That is, the thickness of the functional layer PL disposed on the base layer BL may be about 200 nm or less. In the window WP of an embodiment, by forming the total thickness of the first layer LRL, the middle adhesive layer ML, and the second layer FL, which are disposed on the base layer BL, to be about 200 nm or less, it is possible to minimize thin films stacked on the base layer BL and implement excellent low reflection properties. In addition, the window WP of an embodiment may implement a window WP having excellent wear resistance properties, chemical resistance properties, abrasion resistance properties, and hardness.

In the window WP of an embodiment, the surface reflectance of the window WP may be about 0.5% or less at a wavelength of about 550 nm. The second layer FL is disposed on the uppermost layer of the window WP of an embodiment, and the reflectance on an upper surface of the second layer FL may be about 0.5% or less at a wavelength of about 550 nm. The reflectance on the upper surface of the second layer FL may be about 0.2% to about 0.5% at a wavelength of about 550 nm. Meanwhile, in the present specification, the "reflectance" of the window WP is defined as a ratio of light reflected from the surface of the window WP to the outside with respect to light incident from the outside toward the inside of the window WP. The light reflected from the surface of the window WP to the outside includes both specularly reflected light (i.e., light that is reflected at an angle relative to the normal of the surface that is the same as the angle at which the light is incident) and diffusely reflected light (i.e., light that is scattered and reflected in various directions). That is, in the present specification, the reflectance is defined as specular component included (SCI) reflectance.

Referring to FIG. 2, FIG. 4, and FIG. 5 together, when the anti-reflection layer RCL included in the display module DM includes a plurality of color filters CF as in the display device DD of an embodiment, the display efficiency may be improved compared to a case in which a polarizing layer is included, but the reflectance may be increased. The window WP according to an embodiment includes the base layer BL having a relatively high refractive index, and includes, on the base layer BL, the functional layer PL including a material having a lower refractive index than the base layer BL, and thus may show properties of having a low surface reflectance. Accordingly, the display device DD including the window WP of an embodiment may have a surface reflectance maintained low over the entire display device DD.

Figure 6A:
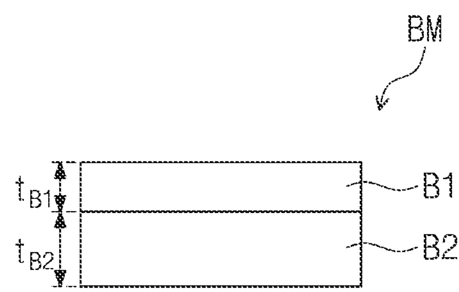
FIG. 6A and FIG. 6B are each a cross-sectional view showing an enlarged partial configuration of a window according to an embodiment of the present disclosure.
Figure 6B:
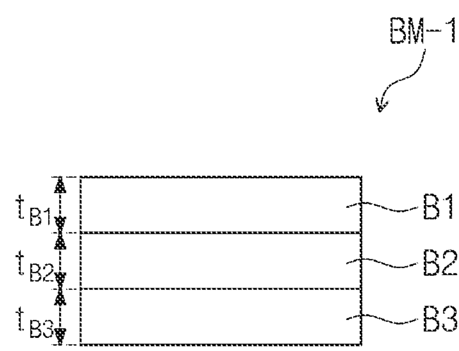

FIG. 6A and FIG. 6B are each a cross-sectional view showing an enlarged partial configuration of a window according to an embodiment. FIG. 6A and FIG. 6B illustrate an enlarged print layer included in an embodiment.

Referring to FIG. 3, FIG. 6A, and FIG. 6B together, print layers BM and BM-1 may be layers for preventing light leakage of a display panel DP. The print layer BM or BM-1 may be provided on a lower surface of a base layer BL of a window WP to directly contact an upper surface of a display module DM disposed in a lower portion of the window WP.

The thickness of the print layers BM and BM-1 may be, for example, about 5 nm to about 20 nm. When the thickness of the print layers BM and BM-1 is less than about 5 nm, it may be difficult to prevent the light leakage of the display panel DP. When the thickness of the print layers BM and BM-1 is greater than about 20 nm, the total thickness of the window WP may increase.

Each of the print layers BM and BM-1 may have a multi-layered structure. As illustrated in FIG. 6A, the print layer BM of an embodiment may have a structure in which two layers are stacked. The print layer BM may include a first print layer B1 and a second print layer B2. The first print layer B1 may be a layer disposed adjacent to the base layer BL. The first print layer B1 may be provided on the lower surface of the base layer BL (FIG. 5). The second print layer B2 may be provided on a lower surface of the first print layer B1. The second print layer B2 may be disposed spaced from the base layer BL with the first print layer B1 interposed therebetween.

The thickness of the print layer BM including the first print layer B1 and the second print layer B2 may be, for example, about 12 nm to about 15 nm. In an embodiment, the first print layer B1 may have a thickness of $t_{B1}$ of about 3 nm to about 8 nm, and the second print layer B2 may have a thickness $t_{B2}$ of about 5 nm to about 10 nm. When the first print layer B1 and the second print layer B2 are in the thickness ranges described above, an excellent light leakage prevention effect may be provided without color difference variation. Meanwhile, FIG. 6A illustrates that the second print layer B2 has a greater thickness than the first print layer B1, but the embodiment is not limited thereto. Unlike what is illustrated in FIG. 6A, the thickness $t_{B2}$ of the second print layer B2 may be smaller than the thickness $t_{B1}$ of the first print layer B1.

The first print layer B1 and the second print layer B2 may each include at least one of an acrylic urethane-based compound, an epoxy-based compound, a polyester-based compound, or an epoxy ester-based compound. In an embodiment, the first print layer B1 and the second print layer B2 may include materials different from each other. For example, the first print layer B1 may include an acrylic urethane-based compound or a polyester-based compound, and the second print layer B2 may include an epoxy-based compound or an epoxy ester-based compound. However, the embodiment is not limited thereto, and the first print layer B1 and the second print layer B2 may include material with the same functional group. Since the first print layer B1 and the second print layer B2 include the above-described materials, high heat resistance is exhibited even in a deposition process of about 150° C., so that cracks may be avoided and excellent color difference (ΔE) may be achieved.

Referring to FIG. 6B, the print layer BM-1 of an embodiment may have a structure in which three layers are stacked. The print layer BM-1 may include a first print layer B1, a second print layer B2, and a third print layer B3. The first print layer B1, the second print layer B2, and the third print layer B3 may be sequentially disposed on a lower portion of the base layer BL (FIG. 5). The first print layer B1 may be a layer disposed adjacent to the base layer BL. The first print layer B1 may be provided on a lower surface of the base layer BL (FIG. 5). The second print layer B2 may be provided on a lower surface of the first print layer B1, and the third print layer B3 may be provided on a lower surface of the second print layer B2. The third print layer B3 may be a layer disposed spaced farthest apart from the base layer BL.

The thickness of the print layer BM-1 including the first print layer B1, the second print layer B2, and the third print layer B3 may be, for example, about 12 nm to about 15 nm. In an embodiment, the first print layer B1 may have a thickness of $t_{B1}$ of about 2 nm to about 5 nm, the second print layer B2 may have a thickness $t_{B2}$ of about 3 nm to about 5 nm, and the third print layer B3 may have a thickness $t_{B3}$ of about 3 nm to about 5 nm. When the first to third print layers B1, B2, and B3 have thickness in the ranges described above, an excellent light leakage prevention effect may be provided without color difference variation. FIG. 6B illustrates that the first to third print layers B1, B2, and B3 have substantially the same thickness, but the embodiment is not limited thereto. Unlike what is illustrated in FIG. 6B, the thickness $t_{B1}$ of the first print layer B1 may be greater or less than the thickness $t_{B2}$ of the second print layer B2 and/or the thickness $t_{B3}$ of the third print layer B3.

The first to third print layers B1, B2, and B3 may each include at least one of an acrylic urethane-based compound, an epoxy-based compound, a polyester-based compound, or an epoxy ester-based compound. In an embodiment, the first, second, and third print layers B1, B2, and B3 may have the same material, or materials different from each other. For example, the first print layer B1 and the second print layer B2 may include the same material, and the third print layer B3 may include a material different from that of the first print layer B1 and that of the second print layer B2. In an embodiment, the first print layer B1 and the second print layer B2 may include a polyester-based compound, and the third print layer B3 may include an epoxy ester-based compound, but the embodiment is not limited thereto. Since the first to third print layers B1, B2, and B3 include the above-described materials, high heat resistance is exhibited even in a deposition process of about 150° C., so that cracks may be avoided, and excellent color difference (ΔE) may be achieved.

In an embodiment, the print layers BM and BM-1 may be formed through various deposition methods. For example, the print layers BM and BM-1 may be formed on the lower surface of the base layer BL through an electron beam deposition process. In the electron beam deposition process for forming the print layers BM and BM-1, the temperature of a deposition chamber may be about 150° C. In an embodiment, the print layers BM and BM-1 of a multi-layered structure have the above-described thickness ranges, and include at least one of an acrylic urethane-based compound, an epoxy-based compound, a polyester-based compound, or an epoxy ester-based compound, and thus may exhibit excellent adhesion force of 4B or greater as measured by the x-cut test, and may provide an excellent light leakage prevention effect wherein the color difference (ΔE) before and after a manufacturing process are both 0.5 or less.

Figure 7A:
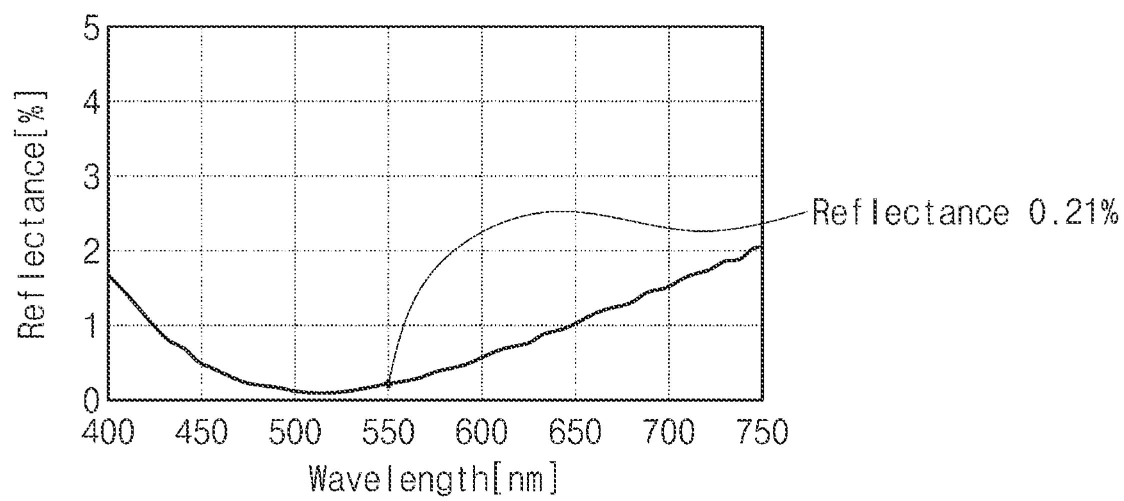
FIG. 7A and FIG. 7B are each a graph showing a reflectance evaluation result for a window according to an embodiment of the present disclosure.
Figure 7B:
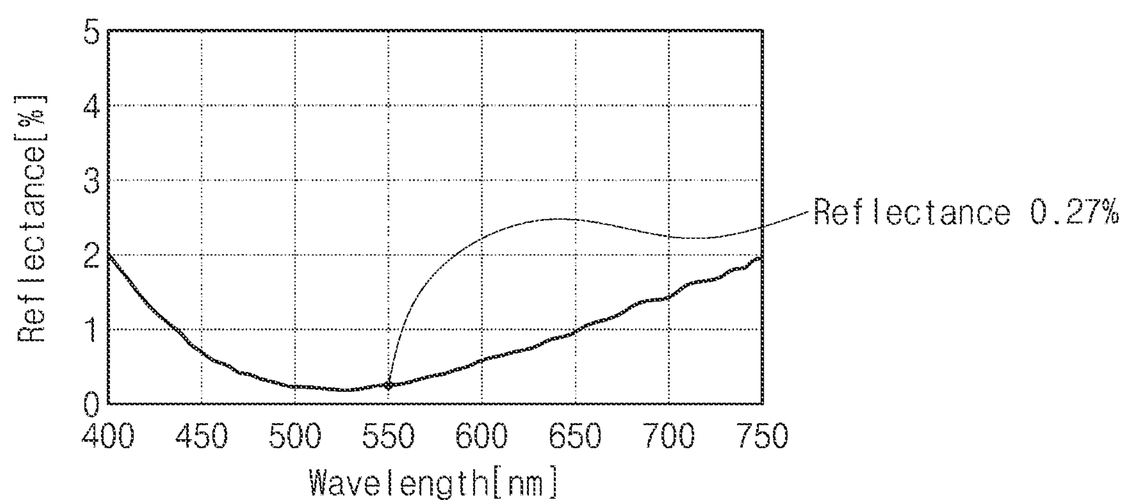
Figure 7C:
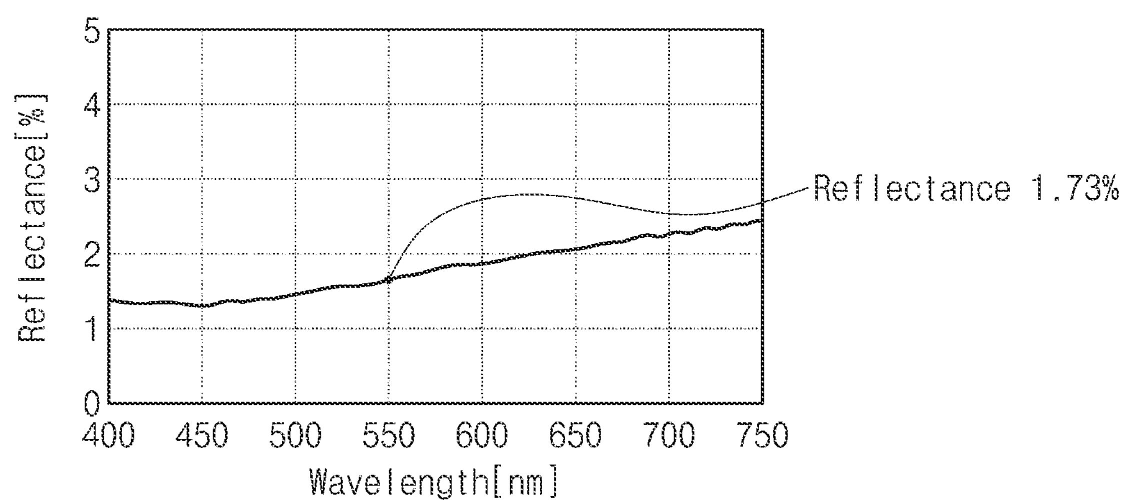
FIG. 7C is a graph showing a reflectance evaluation result for a window of a comparative example.

FIG. 7A and FIG. 7B are each a graph showing the reflectance evaluation result for a window according to an embodiment, and FIG. 7C is a graph showing the reflectance evaluation result for a window of Comparative Example. FIG. 7A shows the reflectance evaluation result of a window according to Example 1, and FIG. 7B shows the reflectance evaluation result of a window according to Example 2. FIG. 7C shows the reflectance evaluation result of a window according to Comparative Example.

In FIG. 7A to FIG. 7C, each window is a window having a structure in which a print layer, a base layer, a first layer, a middle adhesive layer, and a second layer are sequentially stacked as illustrated in FIG. 5.

There is a difference in that the first layer of the window in Example 1 includes magnesium fluoride ($MgF_2$), and the first layer of the window in Example 2 includes a solid solution in which magnesium fluoride ($MgF_2$), yttrium oxyfluoride (YOF), and magnesium oxide (MgO) are mixed. In Example 1 and Example 2, a glass substrate having a refractive index of about 1.80 was used as the base layer of the window. Meanwhile, the window of Comparative Example differs in refractive index of the base layer from the window of Example 1 and Example 2. Specifically, in Comparative Example, the first layer of the window includes magnesium fluoride ($MgF_2$) as in Example 1, but a glass substrate having a refractive index of about 1.52 was used as the base layer.

Table 1 below shows optical properties evaluation results for the windows of Examples 1 and 2 and the window of the Comparative Example. The reflectance was measured using equipment of CM-3700A (KONICA MINOLTA Co., Ltd.), and the reflectance at a wavelength of about 550 nm was described in Table 1 below. A D65 light source was used to measure the reflectance, and the reflectance was measured under the condition of a 2° viewing angle.

TABLE 1

| | Example 1 | Example 2 | Comparative Example |
|---|---|---|---|
| SCI reflectance (%) | 0.21 | 0.27 | 1.73% |

Referring to FIG. 7A to FIG. 7C, and Table 1 above, the windows of Example 1 and Example 2 exhibited a low reflectance compared to the window of the Comparative Example at a wavelength region of about 400 nm to about 750 nm. Specifically, at a wavelength of about 550 nm, the window of Example 1 exhibited a reflectance of about 0.21%, and the window of Example 2 exhibited a low reflectance of about 0.27%. In comparison, the window of Comparative Example exhibited a reflectance of about 1.73% at a wavelength of about 550 nm, thereby exhibiting a reflectance which was about 8 times or higher or about 6 times or higher than that of the windows of Example 1 and Example 2.

From the above results, it can be confirmed that the window according to an embodiment exhibits excellent low reflection properties. Therefore, when the window of an embodiment is applied to a display device, it may provide excellent optical properties.

A window of a display device may be required to have low reflectance properties to minimize the reflection of light incident from the outside of the display device while exhibiting excellent mechanical properties to protect the display device from external stimuli. Particularly, the window disposed in an upper portion of the display device may be subjected to external artificial contacts, thereby being very vulnerable to scratches and wear, and thus may be required to have high resistance against vibration wear and the like. In the embodiments described herein, by introducing a base layer having high-refractive properties in a window applied to a display device, it is possible to simultaneously implement a reflection prevention effect and prevent degradation in mechanical properties, thereby improving durability properties.

According to an embodiment, a window includes a base layer having high-refractive properties and includes a plurality of layers exhibiting low-refractive properties on the base layer, and thus may exhibit a low surface reflectance and excellent mechanical strength. Accordingly, a display device including the window of an embodiment described above may have improved durability and reliability.

Although specific embodiments have been described, it will be understood by those skilled in the art that various changes in form and details may be made therein without departing from the spirit and scope as set forth in the following claims. Accordingly, the technical scope is not intended to be limited to the contents set forth in the detailed description of the specification but is intended to be defined by the appended claims.

What is claimed is:

1. A window comprising:

a base layer including a transmission region and a bezel region adjacent to the transmission region, the base layer having a refractive index of about 1.6 to about 2.0;

a first layer disposed on an upper side of the base layer, the first layer having a refractive index lower than the refractive index of the base layer;

a second layer disposed on an upper side of the first layer;

a middle adhesive layer disposed between the first layer and the second layer; and a print layer disposed on a lower side of the base layer, wherein:

the first layer, the second layer, and the middle adhesive layer each overlap the transmission region and the bezel region; and the print layer overlaps the bezel region.

2. The window of claim 1, wherein the refractive index of the base layer is about 1.8 to about 2.0.

3. The window of claim 1, wherein:

the refractive index of the first layer is about 1.3 to about 1.5; and a refractive index of the middle adhesive layer is about 1.3 to about 1.6.

4. The window of claim 1, wherein the first layer and the middle adhesive layer each comprise at least one of silicon dioxide ($SiO_2$), fused silica, fluorine-doped fused silica, magnesium fluoride ($MgF_2$), calcium fluoride ($CaF_2$), aluminum fluoride ($AlF_3$), yttrium fluoride ($YF_3$), ytterbium fluoride ($YbF_3$), yttrium oxyfluoride (YOF), aluminum oxide ($Al_2O_3$), magnesium oxide (MgO), or $Si_xO_yMg_zAl_uN_v$, wherein in the $Si_xO_yMg_zAl_uN_v$, each of x, y, z, u, and v is in a range from 0 to 1 and a sum X+y+z+u+v is equal to or less than 1.

5. The window of claim 4, wherein the first layer comprises the magnesium fluoride ($MgF_2$) alone or in a solid solution in which the magnesium fluoride ($MgF_2$) is mixed with the yttrium oxyfluoride (YOF) and the magnesium oxide (MgO).

6. The window of claim 4, wherein the middle adhesive layer comprises a solid solution in which the aluminum oxide and the silicon dioxide are mixed.

7. The window of claim 1, wherein the base layer comprises a glass substrate or a polymer film.

8. The window of claim 1, wherein the second layer comprises a fluorine-based compound.

9. The window of claim 1, wherein Specular Component Included (SCI) reflectance on an upper surface of the second layer is about 0.5% or less.

10. The window of claim 1, wherein a thickness of the print layer is about 5 μm to about 20 μm.

11. The window of claim 10, wherein the print layer comprises:

a first print layer on a lower surface of the base layer; and a second print layer on a lower surface of the first print layer, wherein the first print layer and the second print layer each include at least one of an acrylic urethane-based compound, an epoxy-based compound, a polyester-based compound, or an epoxy ester-based compound.

12. The window of claim 11, wherein:

the first print layer comprises the acrylic urethane-based compound or the polyester-based compound; and the second print layer comprises the epoxy-based compound or the epoxy ester-based compound.

13. The window of claim 11, wherein:

a thickness of the first print layer is about 3 μm to about 8 μm; and a thickness of the second print layer is about 5 μm to about 10 μm.

14. The window of claim 11, wherein the print layer further comprises a third print layer disposed in a lower portion of the second print layer, wherein the third print layer includes the epoxy ester-based compound.

15. The window of claim 14, wherein:

a thickness of the first print layer is about 2 μm to about 5 μm; and a thickness of the second print layer and a thickness of the third print layer are each about 3 μm to about 5 μm.

16. The window of claim 1, wherein:

a thickness of the first layer is about 2 nm to about 40 nm;

a thickness of the second layer is about 2 nm to about 40 nm; and a thickness of the middle adhesive layer is about 5 nm to about 30 nm.

17. A display device comprising:

a display module including a base substrate having a display region and a non-display region adjacent to the display region, a circuit layer disposed on the base substrate, and a display element layer disposed on the circuit layer and having a light control layer; and a window disposed on the display module, wherein the window includes:

a base layer having a refractive index of about of 1.6 to about 2.0;

a first layer disposed on the base layer, the first layer having a refractive index lower than the refractive index of the base layer;

a second layer disposed on the first layer;

a middle adhesive layer disposed between the first layer and the second layer; and a print layer disposed on a lower side of the base layer.

18. The display device of claim 17, wherein the light control layer comprises:

a partition layer in which a plurality of light emitting elements and a plurality of partition openings respectively overlapping the plurality of light emitting elements are defined; and a plurality of color filters disposed on the plurality of partition openings.

19. The display device of claim 17, wherein the print layer overlaps the non-display region and comprises a plurality of layers.

20. The display device of claim 17, wherein at a wavelength of about 550 nm, the SCI reflectance on an uppermost surface of the window is about 0.5% or less.

* * * * *